United States Patent Office

3,574,645
Patented Apr. 13, 1971

3,574,645
TRANSPARENT THORIA-BASE CERAMICS CONTAINING $Y_2O_3$ AND METHOD FOR PRODUCING SAME
Richard C. Anderson, Schenectady, N.Y., assignor to General Electric Company
No Drawing. Filed Mar. 17, 1969, Ser. No. 807,994
Int. Cl. C04b 33/00
U.S. Cl. 106—39       5 Claims

ABSTRACT OF THE DISCLOSURE

The preparation of high density thoria-base ceramic bodies containing up to about 5 mole percent of $Y_2O_3$ is disclosed. These bodies have high orders of in-line transmission of light and are prepared by pressing the mixed powders and sintering in a hydrogen-water vapor atmosphere until theoretical density is achieved.

---

Ceramic materials are widely used in high temperature applications but with few exceptions the materials are completely opaque and cannot be used where light transmission is desired. There exists many situations in which a light transmitting ceramic would be of significant value, such as, for example, as windows for use in high temperature equipment. Further, it could be used for high temperature lamp envelopes and even as a lens material for optical equipment designed to be used at elevated temperatures. In the past, optical transparency in ceramics has been generally achieved through the development and use of single-crystal bodies, usually a time consuming, comparatively costly and physically limiting (due to size restrictions) way of accomplishing the purpose. Obtaining transparency in polycrystalline ceramic bodies would relieve many of the difficulties related to use of single crystal ceramic but many factors must be considered and overcome before any substantial degree of light transmission can be obtained in a polycrystalline body. For example, such things as the presence of particulate matter of sufficient size may cause light scattering in the body and resultant low transmission. Similarly, pores trapped in the body during sintering to final density scatter light much like particles. All of the preceding problems, and others, must be properly overcome to obtain high density, transparent ceramic bodies.

A principal object of this invention is to provide a high density polycrystalline ceramic body having sufficient transmissivity to provide for substantial in-line transmission of radiant energy therethrough.

A further object of this invention is to provide a thoria-base ceramic body having added amounts of yttrium oxide which is substantially transparent.

An additional object of this invention is to provide a process for producing the transparent ceramic bodies of this invention.

Further objects and advantages of this invention will be in part obvious and in part explained by reference to the accompanying specification.

Generally, the polycrystalline ceramic bodies of this invention are thoria-base ($ThO_2$) and contain additions of from about 0.5 to 5.0 mole percent of yttrium oxide ($Y_2O_3$). These bodies are essentially of theoretical density, are polycrystalline of cubic crystallographic form, and are essentially transparent over a wide band of radiation wavelengths in the visible spectrum. The bodies will contain from about 0.5 to 3.0 mole percent yttrium oxide as the preferred range and about 1.0 mole percent as the optimum composition. The process by which these bodies are produced comprises preparing the basic ingredients in the proper proportions, pressing the powdered oxide into green bodies and then firing or sintering the green bodies for a time sufficient to effect densification. Care must be taken during the sintering operation, which is normally carried out in a hydrogen atmosphere having a dew point of about 0° C., that the operating conditions are such to insure that no reduction of the metal oxides occur or that if any oxides are reduced, they are given an opportunity to reoxidize. Failure to adequately control this important firing operation results in bodies of markedly inferior optical characteristics.

The base material for the composition is, as previously stated, thorium oxide, $ThO_2$, and should be as pure as possible since the presence of any impurities could lead to defects in the final article of manufacture that would reduce its light transmitting characteristics.

As a specific working example, a quantity of fine grained thorium oxide having a particle size of about 0.05 to 2.0 microns was thoroughly mixed with a quantity of yttrium oxide which had a particle size of about 0.05 micron to yield a mixture containing about 1.0 mole percent $Y_2O_3$. A quantity of the mixture was die pressed in a known manner at about 10,000 p.s.i. to yield a compacted "green" body having a density of about 40 to 50 percent of the theoretical density. The green body was then sintered to substantially theoretical density at 2300° C. in a hydrogen-water vapor atmosphere having a dew point of 0° C. for about seven hours. A specimen having a thickness of about one millimeter was prepared and was observed to have a high degree of transparency or in-line transmission of light in the visible spectrum, indicative of nearly theoretical density.

Other bodies were prepared in the manner previously set forth having yttria contents up to about 50 mole percent but no significant improvement in transparency was observed and, in fact, when the yttria content exceeded about 5.0 mole percent, the degree of transparency became impaired.

From all the foregoing, it will be seen that the disclosed thoria base, yttrium oxide containing ceramic bodies exhibit improved in-line transmission compared to the properties of an unmodified but otherwise substantially identical thoria body.

It will be apparent to those skilled in the art that numerous departures may be made from the specific examples set forth previously. For example, any substantially pure thoria having a particle size between 0.05 to 2.0 microns and preferably between 0.01 to 1.0 micron may be employed. The particle size of the yttrium oxide should be less than about 2.0 microns and preferably about 0.01 to 1.0 micron. The pressure employed in the pressing operation should be at least 5,000 p.s.i. and of course isostatic pressing may be employed if desired. The sintering temperature should be at least about 2000° C. since temperatures significantly lower than this value require excessively longer periods of time to reach theoretical density. Yet further, the dew point of the hydrogen atmosphere may range between about —25° C. to +25° C. As previously stated, the yttrium oxide content may vary between about 0.5 to 5.0 mole percent.

What I claim as new and desire to secure by Letters Patent of the United States is:

1. As an article of manufacture, a high density polycrystalline thoria-base body consisting essentially of thoria and containing between about 0.5 and 5.0 mole percent of yttrium oxide, said body having a high degree of in-line transmission per millimeter thickness in the visible spectrum.

2. An article of manufacture as set forth in claim 1 in which said yttrium oxide is present in an amount of between about 0.5 and 3.0 mole percent.

3. An article of manufacture as set forth in claim 1 in which said yttrium oxide is present in an amount of about 1.0 mole percent.

4. The process for producing polycrystalline high density thoria-base bodies having improved light transmission properties comprising a particulate mixture of substantially pure thoria having a particle size between about 0.01 to 2.0 microns and from about 0.5 to 5.0 mole percent of substantially pure yttrium oxide having a particle size between about 0.01 to 2.0 microns, compacting the mixture by pressing under a pressure of at least 5,000 p.s.i. to form a green body, and firing the green body at a temperature no lower than about 2000° C. for a time sufficient to effect substantially complete densification under a hydrogen-water vapor atmosphere having a dew point of from about −25° C. to +25° C.

5. The process of claim 4 wherein said atmosphere has a dew point of about 0° C.

No references cited.

HELEN M. McCARTHY, Primary Examiner

W. R. SATTERFIELD, Assistant Examiner

U.S. Cl. X.R.

264—56; 313—221